US011326515B2

(12) United States Patent
Pouyau et al.

(10) Patent No.: US 11,326,515 B2
(45) Date of Patent: May 10, 2022

(54) ARRANGEMENTS FOR DRAWING IN AIR AND TRAPPING FOREIGN BODIES IN AN AIRCRAFT PROPULSION ASSEMBLY

(71) Applicant: Safran Aircraft Engines, Paris (FR)

(72) Inventors: Guillaume Pouyau, Moissy-Cramayel (FR); Alexandre Couilleaux, Moissy-Cramayel (FR); Nicolas Sirvin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 489 days.

(21) Appl. No.: 15/529,419

(22) PCT Filed: Nov. 26, 2015

(86) PCT No.: PCT/FR2015/053219
§ 371 (c)(1),
(2) Date: May 24, 2017

(87) PCT Pub. No.: WO2016/083743
PCT Pub. Date: Jun. 2, 2016

(65) Prior Publication Data
US 2017/0335766 A1    Nov. 23, 2017

(30) Foreign Application Priority Data
Nov. 27, 2014 (FR) ...................... 1461586

(51) Int. Cl.
*F02C 7/14* (2006.01)
*F02C 7/05* (2006.01)
(Continued)

(52) U.S. Cl.
CPC ............... *F02C 7/05* (2013.01); *B64D 33/02* (2013.01); *F01D 25/12* (2013.01); *F02C 7/14* (2013.01);
(Continued)

(58) Field of Classification Search
CPC .................................. F02C 7/14; F02C 7/052
See application file for complete search history.

(56) References Cited

U.S. PATENT DOCUMENTS 5,269,135 A    12/1993   Vermejan et al.
6,282,881 B1 *  9/2001   Beutin .................. B64D 33/10
                                                    184/6.11
(Continued)

FOREIGN PATENT DOCUMENTS

| EP | 0924407 | 6/1999 |
| EP | 2724940 | 4/2014 |
| WO | WO-2014135942 | 9/2014 |

OTHER PUBLICATIONS

SNECMA, "International Search Report and Written Opinion", International Application No. PCT/FR2015/053219, dated Feb. 25, 2016 (with French Translation Cover Sheet).
(Continued)

*Primary Examiner* — Justin D Seabe
(74) *Attorney, Agent, or Firm* — Womble Bond Dickinson (US) LLP

(57) ABSTRACT

The invention relates to an arrangement, in a pod of an aircraft propulsion assembly, for drawing in air and trapping foreign bodies. Said arrangement includes a main air inlet duct (11) separating into, on one hand, a channel (13) for leading air to a compressor and, on the other hand, a bypass channel (12) capable of trapping foreign bodies (5) that enter said main duct (11). Said arrangement comprises a heat exchanger (6) that extends along a section of the bypass channel (12). Said heat exchanger (6) carries out surface heat exchange along said section and is coupled with an external oil system in order to cool the oil thereof by heat exchange with the air (4) flowing in the bypass channel (12).

(Continued)

Said bypass channel (12) has an air outlet (12a) acting as a means for discharging the foreign bodies (5).

3 Claims, 3 Drawing Sheets

(51) Int. Cl.
    *B64D 33/02*       (2006.01)
    *F01D 25/12*       (2006.01)
    *F02C 7/18*        (2006.01)

(52) U.S. Cl.
    CPC .......... *F02C 7/18* (2013.01); *B64D 2033/022* (2013.01); *F05D 2260/213* (2013.01); *Y02T 50/60* (2013.01)

(56) References Cited

U.S. PATENT DOCUMENTS

| | | | | |
|---|---|---|---|---|
| 7,377,100 | B2* | 5/2008 | Bruno | F01D 25/12 60/266 |
| 7,845,159 | B2* | 12/2010 | Venkataramani | F01D 25/12 165/104.14 |
| 8,387,362 | B2* | 3/2013 | Storage | F01D 25/125 60/226.1 |
| 10,274,265 | B2* | 4/2019 | Kenworthy | F02K 3/115 |
| 2010/0028139 | A1* | 2/2010 | Bulin | F01D 9/065 415/178 |

OTHER PUBLICATIONS

SNECMA, "Search Report", FR Application No. 1461586, dated Jul. 31, 2015 (with French Translation CoverSheet).

\* cited by examiner

ARRANGEMENTS FOR DRAWING IN AIR AND TRAPPING FOREIGN BODIES IN AN AIRCRAFT PROPULSION ASSEMBLY

The present invention relates to air inlet and foreign bodies trapping arrangements in an aircraft propulsion assembly.

It finds application advantageously, but without limitation, in the case of airplane turboprops.

GENERAL TECHNICAL FIELD AND PRIOR ART

Turbine engines generally have considerable lubricating needs. In the case of aircraft turboprops in particular, the reduction gearboxes positioned between the engine and the propeller of the turboprop make a considerable contribution to oil consumption. However, the friction that occurs within the reduction gearbox generates a considerable amount of heat which it is necessary to dissipate.

To cool the oil in a circuit in proximity to the air inlet sleeve of a turboprop pod, it has already been proposed in application EP 1.018.468 to provide, downstream of the air inlet, an air bleed which is sent to an air-oil heat exchanger of the volumetric type such as a radiator, so as to cool the oil circulating therein. The air inlet slot which is used to send the air bleed to the exchanger is of small diameter, which limits cooling performance. Such a cooling solution also requires providing, downstream of the exchanger, a regulated outlet through which compressed air bled from the turbine engine is injected into the output of the bleed channel. This compressed air output makes it possible to maintain the desired air flow, including during idle phases of the engine.

To solve the problem of cooling oil circuits of turbine engines, another solution which could be considered would consist of positioning the radiator/heat exchanger directly in the trap-forming duct which turbine engines of the turboprop type conventionally include in their air inlet arrangements so as to trap foreign bodies penetrating into the air inlet sleeve, as described for example in patent application FR 2.614.072.

However, foreign bodies (such as hail or birds), which are likely to circulate in the foreign body trap duct could cause serious damage to the heat exchanger if they were to strike it.

It would then be necessary to arrange a flap such as a pivoting shutter for protecting the exchanger during at-risk flight phases and the removal of foreign bodies through a vertical outlet upstream of the heat exchanger, which would limit air flow at the heat exchanger and would not allow optimal cooling.

This limitation in cooling due to the protective flap and removal would be even more critical because the flight phases where the risks of collision with foreign bodies are greatest are the low-speed phases (takeoff, initial climb, final approach and landing), where the flow of air inside the channel serving as a trap for foreign bodies would be the lowest.

Also known is document EP 2.724.940 which describes a solution equivalent to document FR 2.614.072 wherein a volumetric heat exchanger (which occupies the entire volume of the section of the channel wherein it is installed) is protected against foreign bodies passing through the channel wherein said heat exchanger is installed by a complex protection system located upstream of the heat exchanger. Moreover, such a protection system also tends to limit air flow at the exchanger.

GENERAL PRESENTATION OF THE INVENTION

A general goal of the invention is to propose a solution for cooling oil circuits which is simple and allows improved cooling performance without affecting the performance of the turbine engine.

Yet another goal of the invention is to propose a solution of this type which allows good cooling performance, particularly during phases during which the airplane is at a reduced speed.

In particular, the invention proposes an air inlet and foreign bodies trapping arrangement in a pod of an aircraft propulsion assembly comprising a main air inlet duct separating on the one hand into a channel for leading air to a compressor and on the other hand into a bypass channel capable of trapping foreign bodies penetrating into said main duct, characterized in that it includes a heat exchanger which extends along a section of the bypass channel, said heat exchanger accomplishing surface heat exchange along said section and being coupled to an external oil circuit to cool the oil therein by heat exchange with the air circulating in the bypass channel, said bypass channel having an air outlet used for discharging foreign bodies.

In this manner considerable air flows circulating in the bypass channel forming a trap for foreign bodies are utilized to cool the heat exchanger, the latter accomplishing surface heat exchange. This arrangement makes it possible not to have to provide a flap upstream of the exchanger for removal of foreign bodies.

In addition, by accomplishing surface heat exchange, the capture drag is minimized in comparison with a volumetric heat exchange.

According to a particular feature, the air outlet of the bypass channel is positioned in confluence with an outlet of the exhaust nozzle of the propulsion assembly, the flow of air circulating in the bypass channel being accelerated by the low pressure created by the flow of the exhaust gases at the outlet of the nozzle.

According to a supplementary feature, the bypass channel being formed with a deflection with respect to the main duct, the heat exchanger is positioned in a zone of the bypass channel outside the continuation of the main duct in said bypass channel, so that a foreign body circulating in the bypass channel cannot directly impact the heat exchanger.

According to an additional feature, the heat exchanger is a surface heat exchanger of the plate-and-fin type, and the fins of said plate are oriented in the direction of the flow of air which circulates in said bypass channel, so as to maximize heat exchange.

According to another feature, the heat exchanger uses an internal wall of the section of the bypass channel to accomplish the heat exchange with the air circulating in the bypass channel.

According to a particular feature, the heat exchanger consists of a pipe inside which the oil circulates, said pipe being wound along an external wall of the section of the bypass channel.

According to a supplementary feature, the section of the bypass channel consists of a metallic material.

According to an additional feature, said pipe is in close contact with and rigidly attached to the section of the bypass channel so as to reinforce the stiffness of said section, in particular in zones of said section likely to be impacted directly by foreign bodies circulating in the bypass channel, and to increase heat exchange.

According to another feature, said pipe comprises a truncated tube extending along a serpentine path, said tube being attached in a fluid-tight manner to the section of the bypass channel in such a manner that the external surface of said section forms a wall of the pipe.

According to another aspect, the invention also relates to a turboprop pod including an arrangement according to one of the aforementioned features.

DESCRIPTION OF THE FIGURES

Other features, aims and advantages of the present invention will appear upon reading the detailed description which follows, and referring to the appended drawings, given by way of non-limiting examples wherein.

DESCRIPTION OF ONE OR MORE EMBODIMENTS

Figure 1:
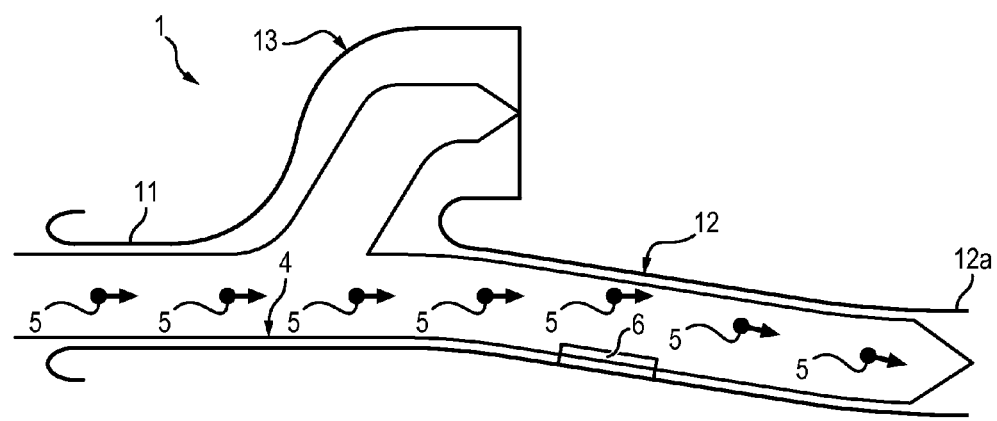
FIG. 1 shows schematically an air inlet and bypass channel arrangement of a propulsion assembly of an aircraft according to one possible embodiment of the invention.

The arrangement 1 according to a first embodiment illustrated in FIG. 1 includes an air inlet duct 11 which is divided into two separate channels, on (bypass channel 12), in the lower portion, which constitutes a channel serving as a trap for foreign bodies, the other (air inlet channel 13) which provides for leading air to the compressor.

With such an arrangement, possible foreign bodies 5 which are carried by an air flow 4 which enters into the air inlet arrangement of the propulsion assembly through the duct 11, are directed toward the bypass channel 12 forming a trap and do not enter into the air inlet channel 13. The aircraft propulsion assembly is thus protected from potential damage which foreign bodies 5 can cause.

The arrangement also includes, inside the bypass channel 12, a heat exchanger 6 which is of the surface type (for example an exchanger of the "SACOC" (surface air cooler oil cooler) type) which is arranged to be flush with an internal wall of a section of said bypass channel 12.

This surface heat exchanger 6 serves to cool the oil of a lubricating oil circuit, in the case of a turbine engine for example, the oil circuit of the reduction gearbox between the compressor and the propeller. In the embodiment shown in FIG. 1, it is for example constituted of a plate with fins on the inner wall of the channel 12, at the bottom thereof. The oil circulation fins of said plate are then oriented in the direction of the air flow 4 which circulates in said bypass channel 12 so as to maximize heat exchange between the oil and the air 4.

This surface heat exchanger 6 accomplishes a surface heat exchange along the section of the bypass channel 12. In fact, the heat exchange takes place at the surface of the section which is covered by the surface heat exchanger 6, and not in the entire volume of said section. In fact, volume heat exchangers occupy the entire volume of the section of the channel in which they are situated, thus accomplishing heat exchange over the entire volume of said section, which makes them sensitive to the impacts of foreign bodies 5.

Surface heat exchange (and therefore a surface heat exchanger 6) offers the advantage of not requiring a removal flap upstream of the heat exchanger 6. The heat exchanger 6 can consequently benefit from the entire flow in the bypass channel 12 which serves as a trap for foreign bodies. Thus the cooling performance of the lubricating oil is improved. Moreover, the fact of not using a dedicated system for protecting the heat exchanger 6 from foreign bodies 5 makes it possible to simplify the structure of the arrangement 1.

In addition, given that the heat exchanger 6 is selected as a surface type, and therefore does not occupy or occupies only a small portion of the interior space of the bypass channel 12, the impacts with foreign bodies 5 are minimized, these leaving the bypass channel 12 by a single air outlet 12a which said bypass channel 12 includes.

Moreover, so as to limit the impacts of foreign bodies 5 on the heat exchanger 6, said heat exchanger 6 is placed in a zone of the bypass channel 12 which has little likelihood of being impacted directly by foreign bodies 5.

In particular, the bypass channel 12 has a dropping curvature with respect to the air inlet 11 and the surface heat exchanger 6 is situated in the bottom of this dropping curvature, so as not to be in the direct continuation of the air inlet duct 11.

Figure 2:
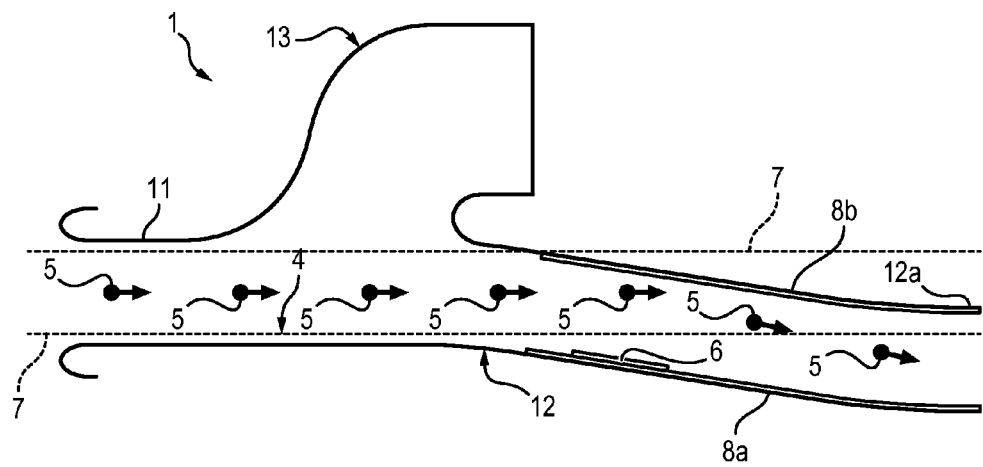
FIG. 2 illustrates the arrangement of the surface exchanger with respect to the trajectory of foreign bodies in the bypass channel.

In FIG. 2, the chain-dotted lines 7 show schematically the continuation of said inlet duct 11 and the general direction of the flow of air 4 when it enters into the bypass channel 12 forming a trap for foreign bodies. The zone 8a below this air flow is a zone protected from impacts by foreign bodies 5, while the zone 8b between the lines 7 is, for its part, impacted directly by said foreign bodies 5.

With such an arrangement where the heat exchanger 6 is placed in the zone protected from impacts 8a, in the portion located outside the continuation lines 7 of the air inlet 11, the foreign bodies 5 cannot directly impact the heat exchanger 6.

Figure 3:
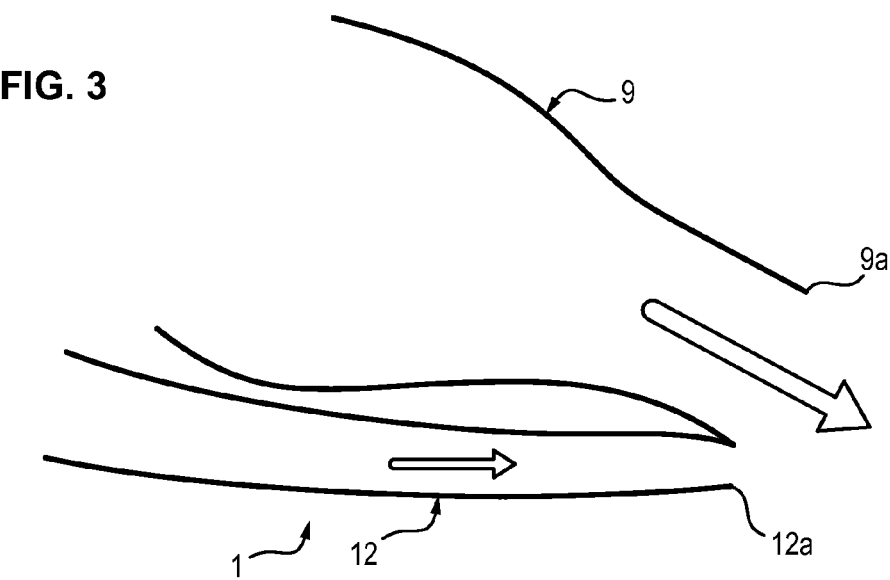
FIG. 3 illustrates a preferred arrangement of the outlet of the bypass channel with respect to the outlet flow of the exhaust nozzle of the propulsion assembly of an aircraft.

Moreover, as illustrated in FIG. 3, so as to increase the flow speed of cooling inside the bypass channel 12 forming a trap for foreign bodies 5, the air outlet 12a thereof is provided not at the body of the exhaust nozzle 9, but in confluence with the outlet 9a of the nozzle 9 of the propulsion assembly.

In this manner, the air flow leaving the outlet 9a of the nozzle 9 creates a vacuum at the air outlet 12a of the bypass channel 12 and the air flow 4 circulating in the bypass channel 12 is accelerated by the outlet flow of the nozzle 9 thanks to an effect of the "jet ejector" type.

Thus, the flow in the channel 12 has a constant high speed which ensures effective cooling of the oil at the heat exchanger 6, including during phases wherein the airplane is at low speed.

Figure 4:
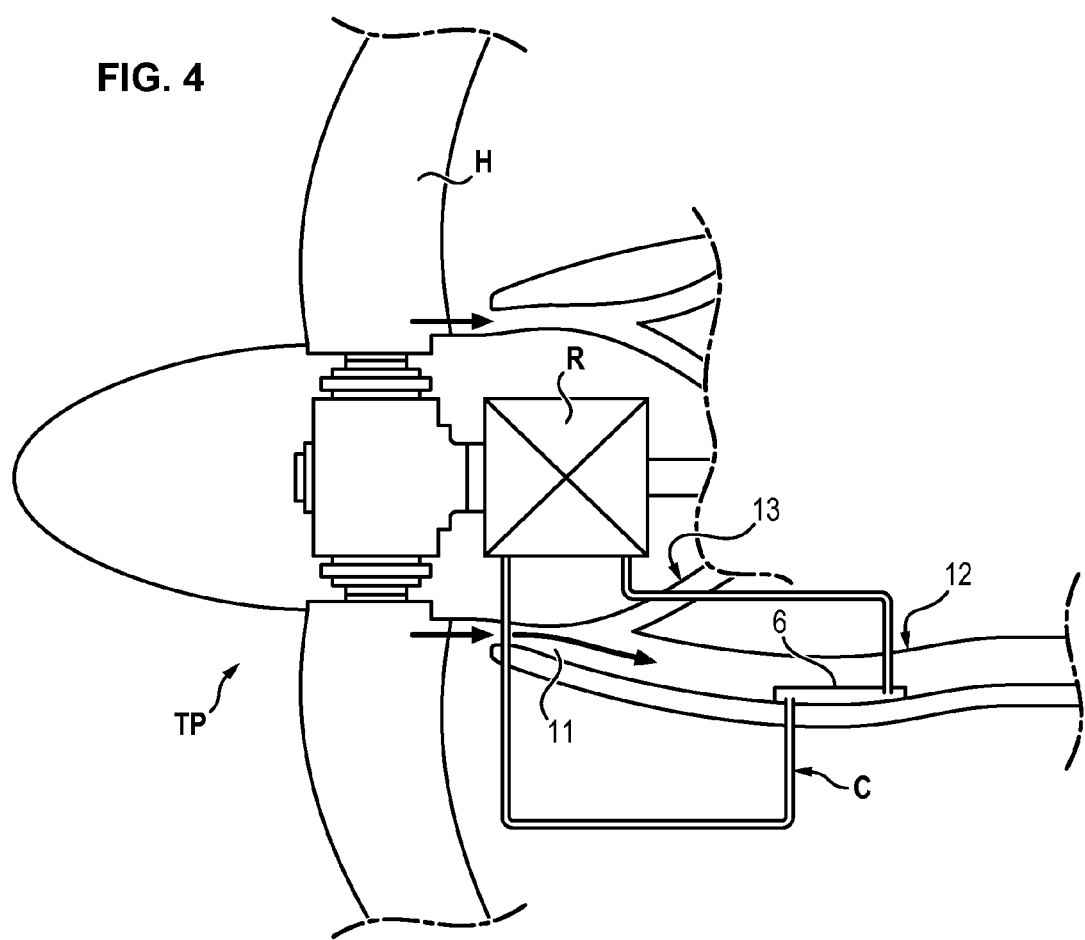
FIG. 4 illustrates schematically a turboprop including an arrangement of the type of that illustrated in FIGS. 1 through 3.

As will have been understood, and as illustrated in FIG. 4, an arrangement of the type of that which has just been described is advantageously utilized within the framework of a turboprop. That is what FIG. 4 illustrates, on which has been shown a turboprop TP including a propeller H, as well as a reducer R and its oil circuit C. This oil circuit is cooled there by a surface heat exchanger 6 positioned on the inner wall of the bypass channel 12.

Figure 5:
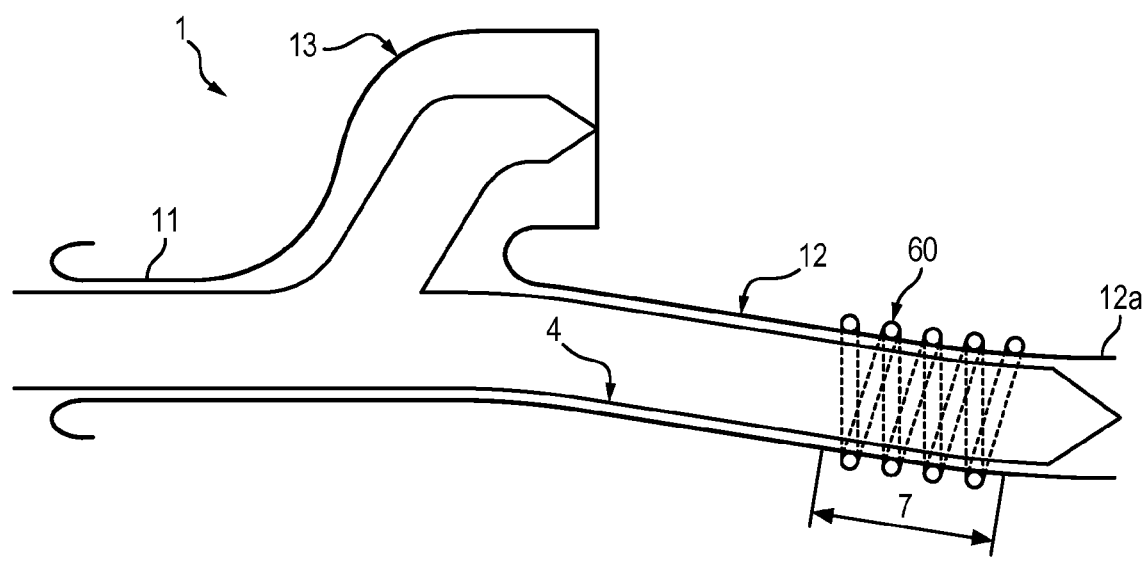
FIG. 5 illustrates a variant embodiment of the surface exchanger wherein said heat exchanger consists of a pipe wound around the bypass channel.

According to a variant embodiment, which can be accomplished for example by an arrangement like that illustrated in FIG. 5, the surface heat exchanger 6 uses an internal wall of the section of said bypass channel 12 to accomplish the heat exchange with the air 4 circulating in the bypass channel 12. More precisely, in this variant, the heat exchange between the air 4 and the heat exchanger 6 occurs at the inner wall of the section in which the heat exchanger is positioned.

According to a variant embodiment illustrated in FIG. 5, the heat exchanger 6 can consist of a pipe 60 which is wound in the form of a serpentine along an outer wall of a section of the bypass channel 12. The lubricating oil which is to be cooled circulates inside the pipe 60, thus forming a cooling surface 7 which covers the perimeter of the section on which the pipe 60 is wound. Thus, the heat exchanger 6 according to such a variant accomplishes surface heat exchange along the section of the bypass channel 12.

In the variant illustrated in FIG. 5, the heat exchanger 6 is such that the heat exchange with the air 4 is accomplished through an inner wall of the section of the bypass channel 12.

In order to improve heat exchange between the oil circulating in the pipe 60 and the air 4 circulating inside the bypass channel 12, the section of the bypass channel 12 consists of a metallic material.

According to an advantageous feature, the pipe 60 is in close contact with and rigidly attached to the section of the bypass channel 12, thus making it possible, on the one hand, to increase heat exchange between the oil and the air 4, and on the other hand to reinforce the stiffness of the section of the bypass channel 12, in particular in the zones of said section which are likely to be impacted directly by foreign bodies 5.

The advantage of such a variant is that the heat exchanger 6 is not positioned inside the bypass channel 12, and thus that the heat exchanger 6 is much less vulnerable to foreign bodies 5. Moreover, the heat exchanger 6 does not perturb the air flow 4 that circulates inside the bypass channel 12.

Figure 6:
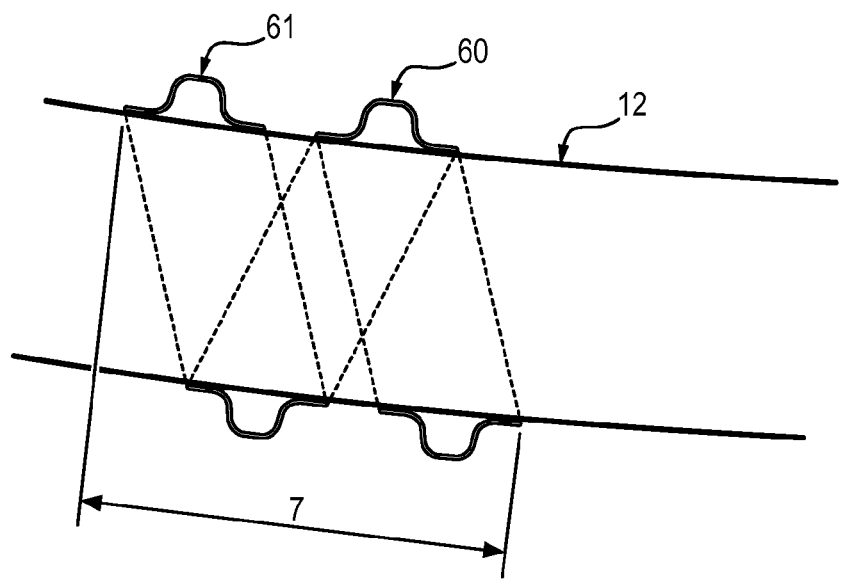
FIG. 6 shows a particular embodiment of a surface exchanger with a channel wound around the bypass channel.

According to a particular embodiment of the variant of the heat exchanger 6 using a pipe 60 wound around the bypass channel 12 which is presented in FIG. 6, the pipe 60 comprises a truncated tube 61 which is attached in a fluid-tight manner on the section of the bypass channel 12 along a serpentine path, so as to form a cavity wherein circulates the lubricating oil to be cooled. Thus, the lubricating oil circulates between the truncated tube 61 and the section of the bypass channel 12, and the external wall of said section forms a wall of the pipe 60.

More precisely, the truncated tube 61 is a hat-shaped wall the concavity whereof is directed toward the bypass channel 12, so as to form the cavity wherein circulates the lubricating oil to be cooled.

The truncated tube 61 can be attached to the bypass channel 12 by welding or by riveting, and with seals.

It is understood that the invention is applicable not only to turboprops but also to other types of turbine engines. In particular, the invention is of interest in turbine engines with un-ducted contra-rotating propellers, also called "open rotor," and more particularly in architectures called "puller," that is those wherein the dual contra-rotating propellers are positioned ahead of the engine.

The invention claimed is:

1. An aircraft propulsion assembly comprising:
   a main air inlet duct defining a first air flow path for introduction of air into the aircraft propulsion assembly;
   an air inlet channel defining a second air flow path for leading air from the main air inlet duct to a compressor;
   a bypass channel defining a third air flow path as a continuation of the first air flow path for leading air from the main air inlet duct to an air outlet, the bypass channel extending at an angle relative to the main air inlet duct such that, when air enters the bypass channel from the main air inlet duct, the air initially continues to flow along the first air flow path within a section of the bypass channel disposed adjacent to the main air inlet duct and extending to a heat exchanger and then continues as the third air flow path, the air outlet of the bypass channel is located coincident with an exhaust nozzle outlet for flow of exhaust gases of an exhaust nozzle of the propulsion unit such that air flowing from the outlet of the exhaust nozzle is in confluence with the air flowing from the outlet of the bypass channel thereby accelerating the air flowing in the bypass channel by low pressure created by the flow of exhaust gases at the outlet of the bypass channel;
   the heat exchanger disposed on an inner surface of the bypass channel extending from the main air inlet duct, the heat exchanger having a lower surface and an upper surface opposite the lower surface, the lower surface of the heat exchanger located on the inner surface of the bypass channel, the upper surface of the heat exchanger extending into the bypass channel and outside the first air flow path such that a foreign body in the air entering the main air inlet duct and entering the bypass channel moves along the first air path and then along the third air path without directly impacting the heat exchanger, the heat exchanger accomplishing surface heat exchange along the section of the bypass channel disposed adjacent to the main air inlet duct and extending to the heat exchanger; and
      an external oil circuit coupled to the heat exchanger, wherein oil in the external oil circuit is cooled by heat exchange with air circulating in the bypass channel.

2. The aircraft propulsion assembly according to claim 1, wherein the heat exchanger is a plate-and-fin type heat exchanger, and wherein the fins of the plate are oriented in a direction of air flow from the main inlet air duct to the air outlet within the bypass channel.

3. The aircraft propulsion assembly according to claim 1, further comprising a turbine engine pod.

* * * * *